(12) United States Patent
Kakadia et al.

(10) Patent No.: US 9,161,263 B2
(45) Date of Patent: Oct. 13, 2015

(54) END-TO-END QUALITY OF SERVICE OPTIMIZATION BASED ON NETWORK PERFORMANCE INDICATORS

(71) Applicant: Verizon Patent and Licensing Inc., Arlington, VA (US)

(72) Inventors: Deepak Kakadia, Union City, CA (US); Emerando M. Delos Reyes, Pleasant Hill, CA (US); Maria G. Lam, Oakland, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 147 days.

(21) Appl. No.: 13/789,110

(22) Filed: Mar. 7, 2013

(65) Prior Publication Data

US 2014/0254370 A1 Sep. 11, 2014

(51) Int. Cl.
*H04W 4/00* (2009.01)
*H04W 28/02* (2009.01)

(52) U.S. Cl.
CPC ................... *H04W 28/0268* (2013.01)

(58) Field of Classification Search
CPC ....... H04L 12/28; H04W 4/00; H04W 76/022
USPC .......................................................... 370/235
See application file for complete search history.

(56) References Cited

U.S. PATENT DOCUMENTS

| 8,363,664 | B2 * | 1/2013 | Ramankutty et al. | 370/401 |
| 2004/0049570 | A1 * | 3/2004 | Frank et al. | 709/223 |
| 2005/0111462 | A1 * | 5/2005 | Walton et al. | 370/395.4 |
| 2007/0153690 | A1 * | 7/2007 | Stanwood et al. | 370/230 |
| 2008/0240053 | A1 * | 10/2008 | Oswal et al. | 370/338 |
| 2010/0022250 | A1 * | 1/2010 | Petrovic et al. | 455/450 |
| 2013/0176988 | A1 * | 7/2013 | Wang et al. | 370/331 |
| 2014/0066052 | A1 * | 3/2014 | Chang et al. | 455/423 |

* cited by examiner

*Primary Examiner* — Curtis A Alia
*Assistant Examiner* — Vanneilian Lalchinthang (57) ABSTRACT

A system may be configured to receive information regarding a quality of service ("QoS") objective for a network. The network may include a group of nodes through which network traffic traverses. Each node, of the group of nodes, may implement one or more queues that indicate an order in which traffic is processed by the node. The system may further identify scheduling information associated with one or more nodes of the network. The queues implemented by the one or more nodes may be based on the identified scheduling information. The system may receive performance information from at least one of the nodes, of the group of nodes; and may generate new scheduling information for at least one node, of the group of nodes, based on the information regarding the QoS objective, the scheduling information associated with the one or more nodes, and the performance information.

19 Claims, 8 Drawing Sheets

| Node ID | Scheduler type | # of queues | Queue weight assignments | Queue param 1 | Queue param 2 | Queue length | WRED |
|---|---|---|---|---|---|---|---|
| Base station 305 | RR | 800 | 10%, 20%, … | 0 | 0 | 64KB, 64KB, … | |
| SGW 320 | PF | 64 | 10%, 20%, … | 2 3 4 | 2 1 2 | 64KB, 128KB, … | |
| PGW 330 | FIFO | 64 | 10%, 20%, … | 0 | 0 | 64KB, 128KB, … | |

END-TO-END QUALITY OF SERVICE OPTIMIZATION BASED ON NETWORK PERFORMANCE INDICATORS

BACKGROUND

Networks, such as cellular telecommunications networks, allow communication between user devices (such as cellular telephones) and other devices (such as servers, other user devices, etc.). Traffic to and/or from user devices may traverse multiple different network devices, such as base stations and/or gateways. These network devices may each employ various different techniques for ensuring quality of service ("QoS") for traffic associated with the user devices. For instance, different vendors of different network devices may implement QoS traffic schedulers differently, which may result in expected network characteristics for the same function to vary greatly.

DETAILED DESCRIPTION OF PREFERRED EMBODIMENTS

The following detailed description refers to the accompanying drawings. The same reference numbers in different drawings may identify the same or similar elements.

Figure 1:
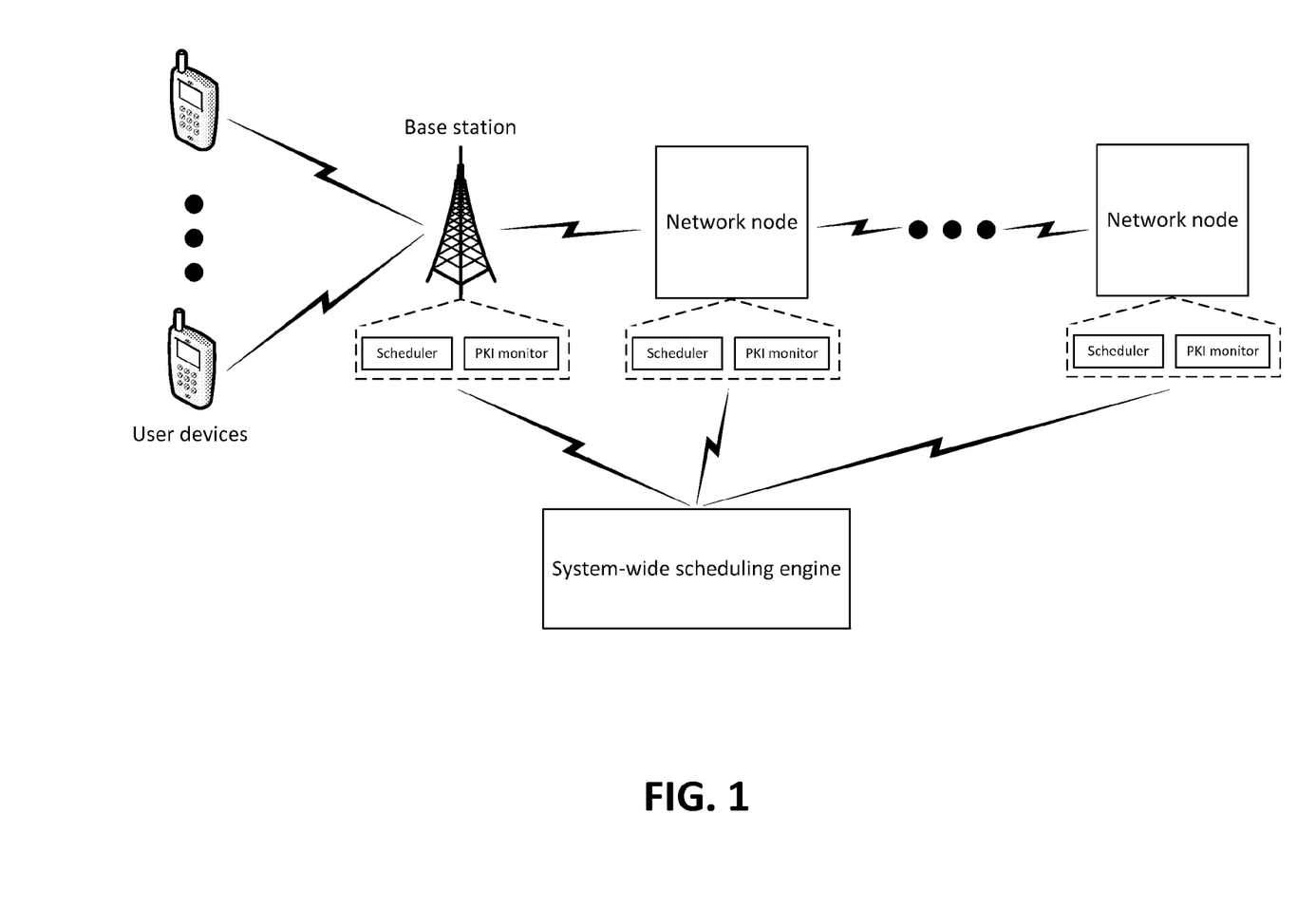
FIG. 1 illustrates an overview of one or more example implementations described herein.

Techniques described herein may allow for configurable end-to-end quality of service ("QoS") control in a network. FIG. 1 illustrates an overview of one or more example implementations described herein. As shown in FIG. 1, a set of user devices (e.g., a cellular telephone) may be in communication with a network (e.g., a cellular telecommunications network), via a base station. The network may include a set of network nodes, which may include a set of devices, through which traffic associated with user devices may traverse. These various network nodes may each include a QoS scheduler and/or a key performance indicator ("KPI") monitor. A particular QoS scheduler, associated with a particular network node, may schedule the processing of data received by and/or output from the particular network node. A particular KPI monitor, associated with a particular network node, may monitor KPIs (such as throughput, latency, or other KPIs) associated with data received by and/or output from the particular network node.

As also shown in FIG. 1, the base station and the network nodes may communicate with a system-wide scheduling engine ("SWSE"). As described further below, the SWSE may output information regarding scheduling techniques and tunable parameters for the scheduling techniques to the base station and/or the network nodes. In some implementations, the SWSE may generate this information based on KPI information received from the base station and/or the network nodes. QoS schedulers associated with the base station and the network nodes may use these scheduling techniques and/or tunable parameters, as determined by the SWSE, when performing scheduling on data received by and/or output from a respective associated base station or network node. In this sense, the SWSE may act as a central controller for multiple network nodes (insomuch as the SWSE may provide information regarding scheduling techniques and/or tunable parameters to these nodes), which may otherwise have performed QoS scheduling independently.

Figure 2A:
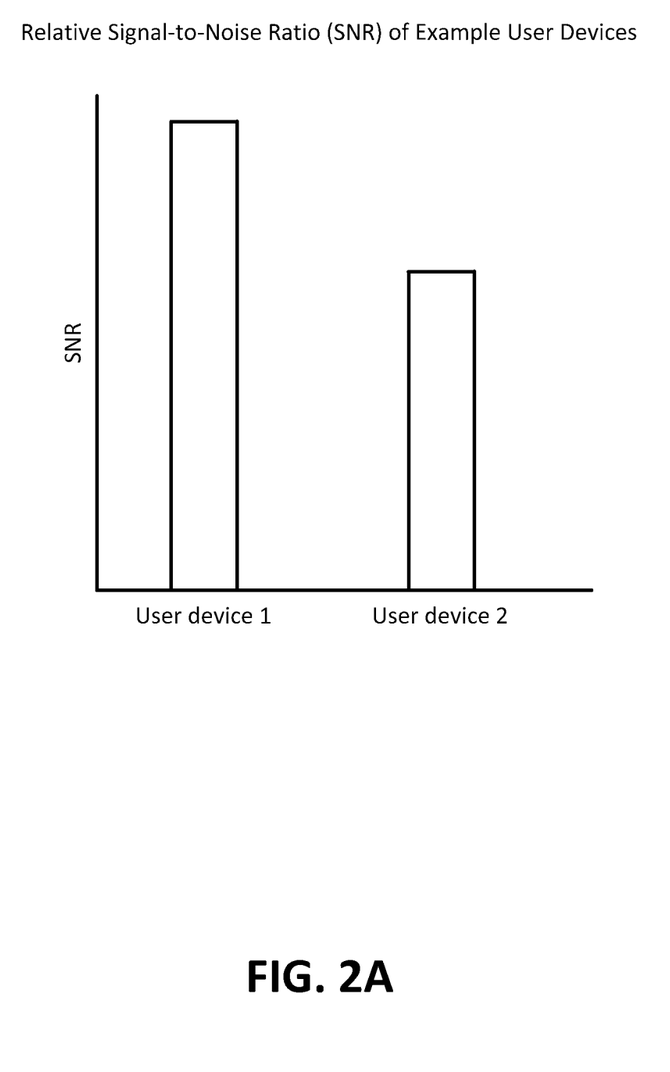
FIGS. 2A and 2B conceptually illustrate effects of different QoS techniques on user device and system throughput.
Figure 2B:
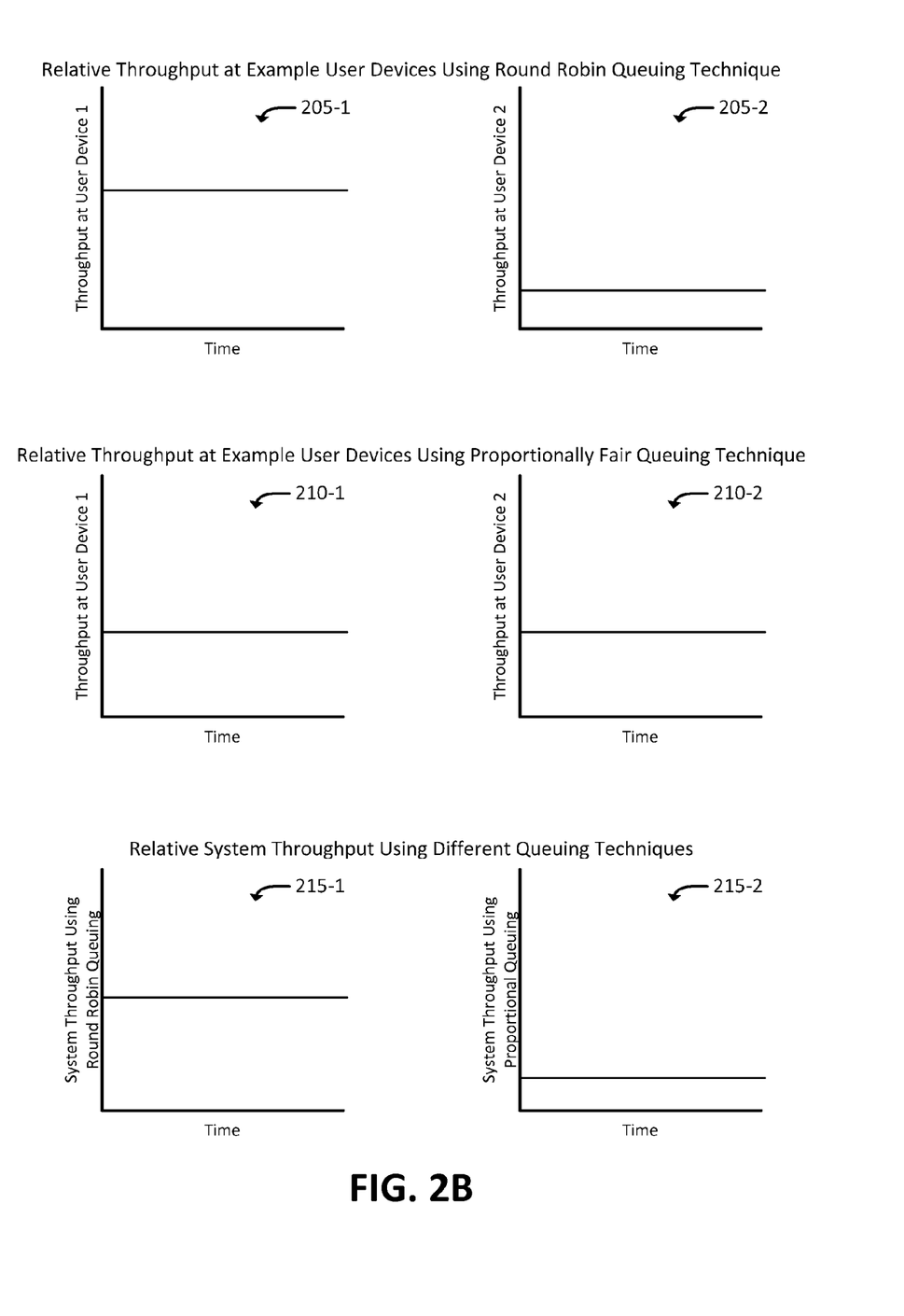

By acting as a central controller, the SWSE may aid in avoiding situations where individual network nodes are performing different QoS scheduling techniques, which may result in sub-optimal or undesired performance. FIGS. 2A and 2B graphically illustrate some such example situations. As shown in FIG. 2A, assume that two different user devices (user device 1 and user device 2) are in communication with a particular base station. User device 1 may have a better quality connection with the base station than user device 2 has with the base station.

For instance, as shown in the graph of FIG. 2A, a signal-to-noise ratio ("SNR") of signals communicated between user device 1 and the base station may be higher than a SNR of signals communicated between user device 2 and the base station. Because user device 1 experiences a higher SNR with respect to the base station than user device 2 does, user device 1 may experience less data loss for signals communicated between user device 1 and the base station.

FIG. 2B conceptually illustrates effects of different QoS techniques on user device 1 and user device 2, as well as on system throughput. For example, graphs 205-1 and 205-2 illustrate the relative throughput at user device 1 and at user device 2, respectively, when a round robin ("RR") queuing technique is used. In a RR queuing technique, equal resources may be allocated to user device 1 and to user device 2. For example, the base station may schedule data packets to be sent to user device 1 in an equal fashion as data packets are scheduled for user device 2 (e.g., equal time slices may be assigned to user devices 1 and 2). As shown by graphs 205-1 and 205-2, using such a RR technique, throughput of data received by user device 1 may be higher than a throughput of data received by user device 2. This difference in relative throughputs may occur because, for example, since user device 2 experiences a lower SNR than user device 1, user device 2 may use a different modulation scheme to transmit data (e.g., to a base station). The different modulation schemes may yield different throughputs (e.g., the modulation scheme used by user device 1 may be a more dense scheme than the one used by user device 2, and may therefore be capable of transmitting more data in the same amount of time). In some situations, this may be disadvantageous, as a network administrator may prefer, for example, that user devices experience similar throughput.

Graphs 210-1 and 210-2 illustrate the relative throughput at user device 1 and at user device 2, respectively, when a proportionally fair ("PF") queuing technique is used. A PF technique may be used to compensate for the difference in SNR between user device 1 and user device 2. For example, the base station may assign a greater quantity of resources to user device 2 than to user device 1 (e.g., may assign more time slices to user device 2 than to user device 1). As shown in graphs 210-1 and 210-2, the throughput at user device 1 may be approximately equal to the throughput at user device 2.

Graphs 215-1 and 215-2 illustrate the relative system throughput (e.g., a measure of throughput that is based on the sum of the throughputs experienced by user devices 1 and 2), using the queuing techniques discussed above. For example, the system throughput may be higher when using a RR technique than when using a PF technique. This may occur in some situations, since more resources are allocated to a user device which experiences a lower SNR when using a PF technique.

Some systems may include multiple nodes, which may each perform scheduling differently (e.g., may use different scheduling techniques, and/or may use different parameters for various scheduling techniques). Thus, the situations described above with respect to FIGS. 2A and 2B may occur unpredictably at different points within a particular system, and may yield unpredictable end-to-end system performance. Some implementations, described herein, may allow a system (such as a cellular telecommunications network) to be configured based on certain goals (e.g., user device throughput maximization, system throughput maximization, etc.).

For example, as described below, a SWSE may control the scheduling performed by various nodes within a network. In some implementations, the SWSE may control the scheduling based on certain goals. Since the SWSE controls the scheduling performed by multiple nodes in a network, network performance may be more predictable and configurable. The SWSE may, continuously and on an ongoing basis, measure and monitor the actual network characteristics of resultant traffic output, analyze the objectives and actual results, and reconfigure and re-tune the QoS schedulers of network nodes such that the optimal network performance objectives are achieved using a control closed loop feedback approach.

Figure 3:
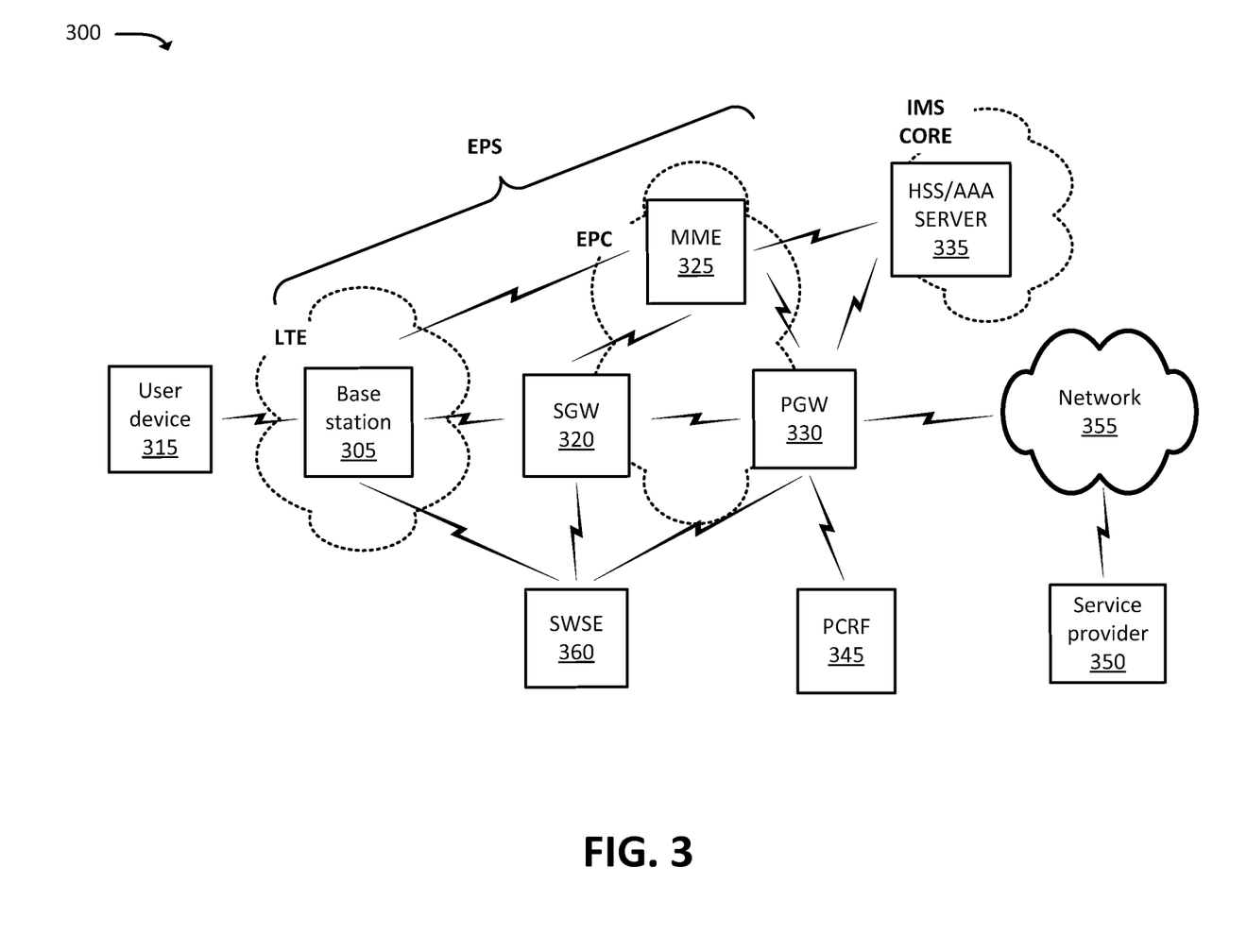
FIG. 3 illustrates an example environment in which systems and/or methods, described herein, may be implemented.

FIG. 3 illustrates an example environment 300, in which systems and/or methods described herein may be implemented. As shown in FIG. 3, environment 300 may include base station 305 (which may, in some implementations, take the form of an evolved node B ("eNB")), user device 315, serving gateway ("SGW") 320, mobility management entity device ("MME") 325, packet data network ("PDN") gateway ("PGW") 330, home subscriber server ("HSS")/authentication, authorization, accounting ("AAA") server 335 (hereinafter referred to as "HSS/AAA server 335"), policy charging and rules function ("PCRF") 345, service provider 350, network 355, and SWSE 360.

The quantity of devices and/or networks, illustrated in FIG. 3, is provided for explanatory purposes only. In practice, there may be additional devices and/or networks; fewer devices and/or networks; different devices and/or networks; or differently arranged devices and/or networks than illustrated in FIG. 3. Alternatively, or additionally, one or more of the devices of environment 300 may perform one or more functions described as being performed by another one or more of the devices of environment 300. Devices of environment 300 may interconnect via wired connections, wireless connections, or a combination of wired and wireless connections.

Environment 300 may include an evolved packet system ("EPS") that includes a LTE network and/or an evolved packet core ("EPC") network that operate based on a third generation partnership project ("3GPP") wireless communication standard. The LTE network may be, or may include, a RAN that includes one or more base stations 305, some or all of which, may take the form of an eNB, via which user device 315 may communicate with the EPC network. The EPC network may include one or more SGWs 320, MMEs 335, and/or PGWs 330, and may enable user device 315 to communicate with network 355 and/or an Internet protocol ("IP") multimedia subsystem ("IMS") core network. The IMS core network may include HSS/AAA server 335, and may manage authentication, session initiation, account information, a user profile, etc. associated with user device 315.

Base station 305 may include one or more network devices that receive, process, and/or transmit traffic, such as calls, audio, video, text, and/or other data, destined for and/or received from user device 315. In one example, base station 305 may be an eNB device and may be part of the LTE network. Additionally, or alternatively, one or more other base stations 305 may be associated with a RAN that is not associated with the LTE network (e.g., a wireless hot spot, a wireless access point, etc.). Base station 305 may receive traffic from and/or send traffic to network 355 via SGW 320 and PGW 330. Base station 305 may send traffic to and/or receive traffic from user device 315 via an air interface.

User device 315 may include any computation and communication device, such as a wireless mobile communication device that is capable of communicating with base station 305 and/or network 355. For example, user device 315 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. User device 315 may send traffic to and/or receive traffic from network 355 via signal bearers, such as base station 305, SGW 320, and/or PGW 330.

SGW 320 may include one or more network devices that gather, process, search, store, and/or provide information in a manner described herein. SGW 320 may, for example, aggregate traffic received from one or more base stations 305 and may send the aggregated traffic to network 355 via PGW 330.

MME 335 may include one or more computation and communication devices that gather, process, search, store, and/or provide information in a manner described herein. For example, MME 335 may perform operations to register user device 315 with the EPS, to establish bearer channels associated with a session with user device 315, to hand off user device 315 from the EPS to another network, to hand off user device 315 from the other network to the EPS, and/or to perform other operations. MME 335 may perform policing operations on traffic destined for and/or received from user device 315.

PGW 330 may include one or more network devices, or other types of computation and communication devices, that gather, process, search, store, and/or provide information in a manner described herein. PGW 330 may aggregate traffic received from one or more SGWs 320, etc. and may send the aggregated traffic to network 355. PGW 330 may also, or alternatively, receive traffic from network 355 and may send the traffic toward user device 315 via SGW 320 and/or base station 305.

HSS/AAA server 335 may include one or more server devices, or other types of devices, that gather, process, search, store, and/or provide information. For example, HSS/AAA server 335 may manage, update, and/or store, in a memory associated with HSS/AAA server 335, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber; and/or other information. The subscriber may be associated with user device 315 and/or one or more other user devices 315. Additionally, or alternatively, HSS/AAA server 335 may perform authentication, authorization, and/or accounting operations associated with the subscriber and/or a communication session with user device 315.

PCRF 345 may include one or more server devices, or other types of devices, that aggregate information to and from the EPC network and/or other sources. PCRF 345 may receive information regarding policies and/or subscriptions from one or more sources, such as subscriber databases and/or from one or more users (such as, for example, an administrator associated with PCRF 345).

Network 355 may include one or more wired and/or wireless networks. For example, network 355 may include a packet data network (PDN), such as an IP-based PDN. Network 355 may include, for example, a wide area network such as the Internet, or one or more other networks. User device 315 may connect, through PGW 330, to data servers, application servers, or to other servers/applications that are coupled to network 355.

SWSE 360 may receive information (e.g., KPI information) from signal bearers, such as base station 305, SGW 320, and PGW 330. As described further below, SWSE 360 may generate or identify information regarding scheduling techniques and/or tunable parameters for the scheduling techniques based on the received information and/or based on information regarding performance goals. Based on this information, base station 305, SGW 320, and/or PGW 330 may schedule the processing of data sent to and/or from user device 315.

Figure 4:
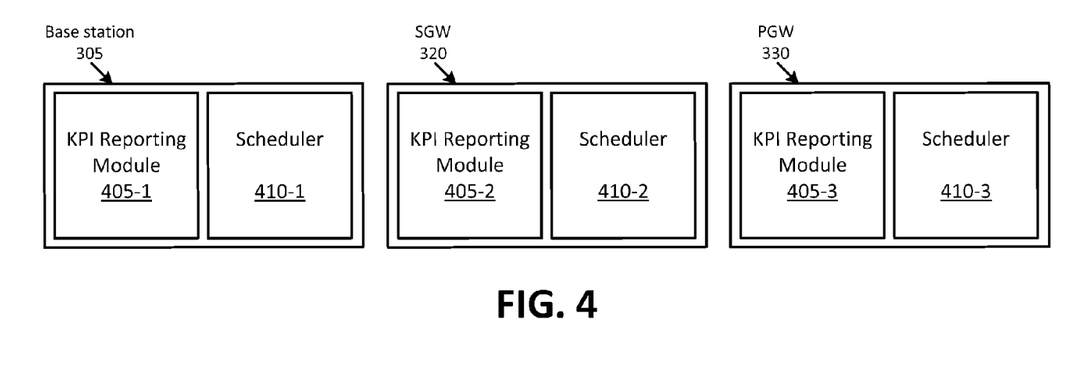
FIG. 4 illustrates example functional components of network nodes, according to some implementations described herein.

FIG. 4 illustrates example functional components of network nodes. For example, FIG. 4 illustrates an example base station 305, SGW 320, and PGW 330. Base station 305 may include KPI reporting module 405-1 and scheduler 410-1, SGW 320 may include KPI reporting module 405-2 and scheduler 410-2, and PGW 330 may include KPI reporting module 405-3 and scheduler 405-3. KPI reporting modules 405-1 through 405-3 may be collectively referred to herein as "KPI reporting modules 405," or individually as "KPI reporting module 405," and schedulers 410-1 through 410-3 may be collectively referred to as "schedulers 410," or individually as "scheduler 410."

A particular KPI reporting module 405 may receive information regarding one or more KPIs associated with a particular node, and may store and/or output some or all of the received information (e.g., to SWSE 360). For example, KPI reporting module 405-1, which is associated with base station 305, may receive information regarding KPIs, such as throughput of data sent to one or more user devices 315, throughput of data received from one or more user devices 315, latency of data sent to one or more user devices 315, latency of data received from one or more user devices 315, signal strength (e.g., SNR) of signals sent to and/or received from one or more user devices 315, packet loss of data sent to one or more user devices 315, and/or one or more other KPIs. KPI reporting module 405-1 may receive such KPI information from one or more components of base station 305, which may be configured to measure or otherwise determine such information. KPI reporting modules 405 associated with other nodes may also receive KPI information regarding data sent to/or from those nodes (e.g., throughput and/or latency).

A particular scheduler 410 may perform scheduling functions for the processing of data received by and/or outputted by a particular node. Scheduler 410 may perform scheduling functions using one or more scheduling techniques, such as a RR scheduling technique, a PF scheduling technique, a weighted fair queuing ("WFQ") scheduling technique, a shortest job first ("SJF") scheduling technique, a shortest time remaining ("STR") scheduling technique, a fixed priority preemptive ("FPP") scheduling technique, a multi-level queue ("MQ") scheduling technique, another scheduling technique, and/or a combination of one or more scheduling techniques.

For example, scheduler 410 may use a scheduling technique to determine an order in which data packets, received and/or output by an associated node, should be processed (e.g., an order in which data packets should be analyzed and/or outputted from the associated node). For instance, scheduler 410 may maintain or monitor one or more queues. The queues may be used to maintain an order in which data packets, associated with user devices, are processed.

For example, under a RR scheduling technique, scheduler 410 may assign the same amount of resources (e.g., equivalent time slices) to data packets associated with each of multiple different user devices. Assume, for instance, that scheduler 410-1 determines that base station 305 receives four data packets—packets $p_0$, $p_1$, $p_2$, and $p_3$. Further assume that packets $p_0$ and $p_1$ are addressed to a first user device, and that packets $p_2$ and $p_3$ are addressed to a second user device. Using the RR scheduling technique, scheduler 410-1 may place the packets in a queue, for processing, in the following order: $p_0$, $p_2$, $p_1$, and $p_3$, and base station 305 may output the data packets in this order.

As another example, when using a PF scheduling technique, different user devices may be associated with different priorities. In this example, scheduler 410 may assign resources proportionally based on priorities associated with different user devices. For instance, assume that a first user device is associated with a higher priority than a second user device. Scheduler 410 may assign more resources for processing data packets associated with the first user device than for processing data packets associated with the second user device. For example, assume that scheduler 410-1 determines that base station 305 receives six data packets—packets $p_4$, $p_5$, $p_6$, $p_7$, $p_8$, and $p_9$. Further assume that packets $p_4$, $p_5$, $p_6$, and $p_9$ are addressed to a first user device, and that packets $p_7$ and $p_8$ are addressed to a second user device. Further assume that the PF scheduling technique, implemented by scheduler 410-1, indicates that two thirds of the resources of base station 305 should be allocated for data packets associated with the first user device, and that one third of the resources of base station 305 should be allocated for data packets associated with the second user device. Using the PF scheduling technique, scheduler 410-1 may place the packets in a queue, for processing, in the following order: $p_4$, $p_5$, $p_6$, $p_9$, $p_7$, and $p_8$, and base station 305 may output the data packets in this order.

As discussed with respect to the above examples, scheduler 410 may schedule data packets according to one or more techniques (e.g., RR, PF, WFQ, etc.). Some of these techniques may be based on one or more parameters. For example, a PF technique may be based on a parameter that indicates how many resources should be allocated to a particular priority level (e.g., in the example above, this parameter may indicate that data packets associated with a particular user device should be allocated twice the resources as compared to data packets associated with a another user device). As another example, a RR technique may be based on a parameter that indicates how long of a time slice should be allocated equally to multiple user devices (e.g., allocate a 10-millisecond time slice per user device, allocate a 1-second time slice per user device, etc.).

As yet another example, another parameter that may be used under one or more scheduling techniques may be queue length. Queue length may refer to how much data (e.g., a quantity of data packets, a cumulative size of data packets, etc.) may be stored by a particular queue before data packets are discarded, or dropped (e.g., dropped in a first in first out ("FIFO") fashion, last in first out ("LIFO") fashion, or some other fashion). For instance, a shorter queue length may correspond to a lower upper bound on the max queuing latency if the packet is not dropped, while a longer queue length may correspond to a higher upper bound on the max queuing latency if the packet is not dropped. While some example scheduling techniques and parameters were discussed above, different and/or additional scheduling techniques and/or parameters may be used in practice.

Figure 5:
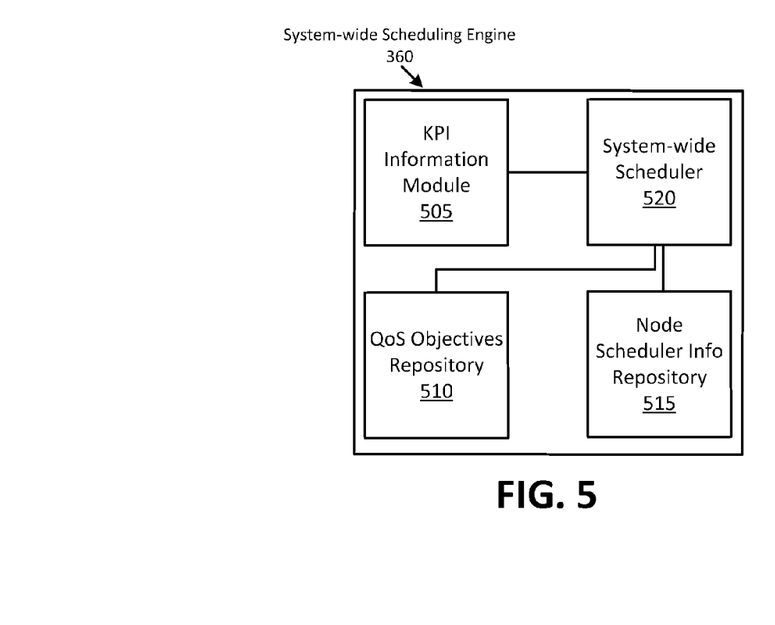
FIG. 5 illustrates example functional components of a system-wide scheduling engine, according to some implementations described herein.

FIG. 5 illustrates example functional components of a SWSE. As shown, SWSE 360 may include KPI information module 505, QoS objectives repository 510, node scheduler information repository 515, and system-wide scheduler 520. In some implementations, modules 505-520 may be implemented via hardware and/or software. In some implementations, SWSE 360 may include additional, fewer, different, or differently arranged modules than those illustrated in the example shown in FIG. 5.

KPI information module 505 may receive and/or store information regarding KPIs, which may be measured or identified at various network nodes. For example, KPI information module 505 may receive KPI information form base station 305, SGW 320, and/or PGW 330. As mentioned above, the KPI information may be related to throughput, latency, packet loss, and/or other KPIs.

QoS objectives repository 510 may receive and/or store QoS objective information. QoS objective information may include information regarding QoS objectives, such as maximizing user device throughput, maximizing system throughput, minimizing user device latency, minimizing packet loss, and/or other QoS objectives. In some implementations, the QoS objective information may indicate a balance of multiple different QoS objectives (e.g., may specify a minimum desired user device throughput and a maximum desired user device latency, a proportion of resources (e.g., queue resources) that should be dedicated to maximizing user device throughput versus maximizing system throughput, etc.). QoS objectives repository 510 may receive the information regarding QoS objectives from, for example, an administrator associated with SWSE 360.

Node scheduler information repository 515 may receive and/or store information regarding scheduling techniques, and/or scheduling parameters associated with scheduling techniques, used by various nodes. As mentioned above, these nodes may include network devices through which traffic, associated with user devices 315, traverse (e.g., base station 305, SGW 320, PGW 330, etc.).

Figure 6:
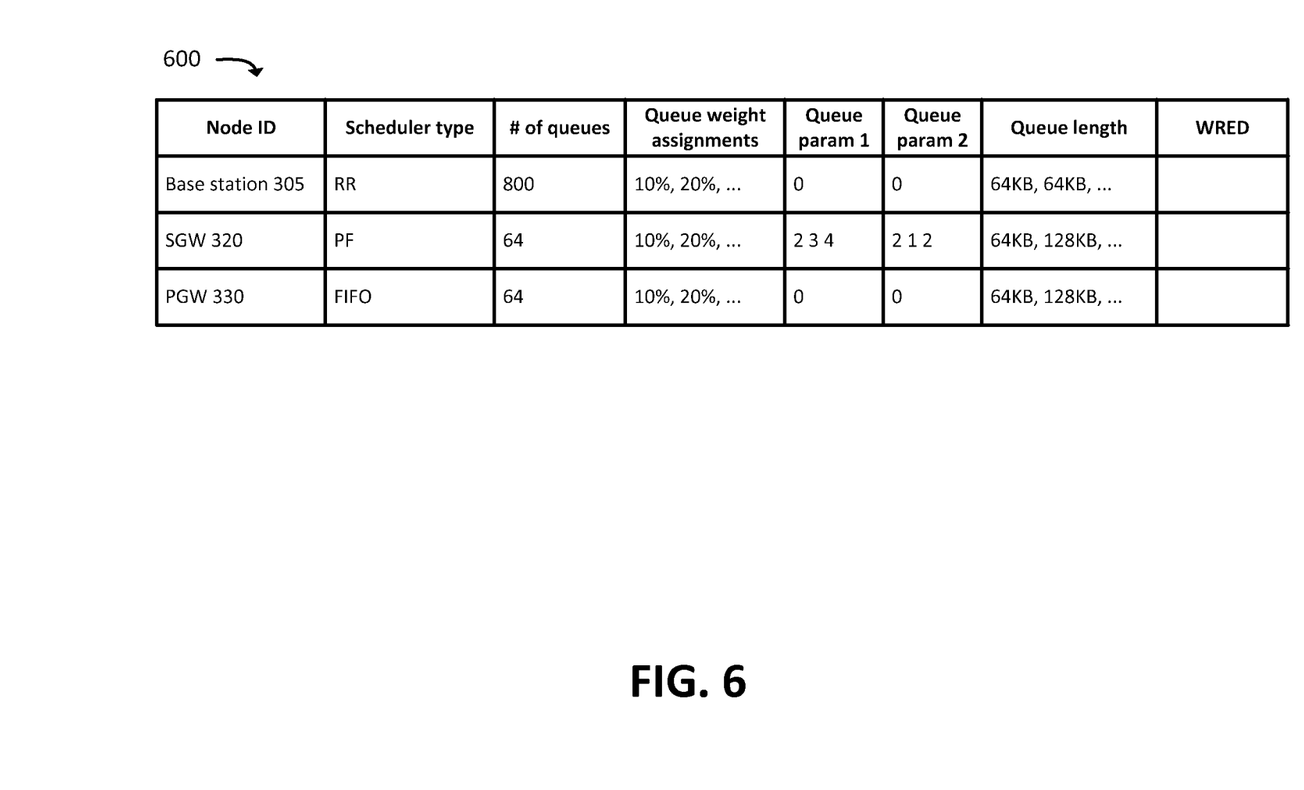
FIG. 6 illustrates an example data structure that may be stored by a system-wide scheduling engine.

FIG. 6 illustrates an example data structure 600, which may be stored by node scheduler information repository 515. As shown, data structure 600 may include information regarding various nodes, such as base station 305, SGW 320, and PGW 330. Data structure 600 may include, for example, identifying information for nodes, ("Node ID," such as a device name, a device type, an Internet Protocol ("IP") address, and/or any other type of identifier), and information identifying types of schedulers (e.g., scheduling techniques) used by the nodes ("Scheduler type"). As also shown, data structure 600 may include information regarding tunable parameters for scheduling techniques, such as a number of queues, queue weight assignments, parameters used for scheduling techniques (shown in FIG. 6 as "Queue param 1" and "Queue param 2;" in practice, any quantity of queue parameters may be used), queue length, and weighted random early discard ("WRED") parameters.

The parameters for scheduling techniques (e.g., Queue param 1 and Queue param 2), stored by data structure 600, may correspond to types of parameters that are relevant to corresponding scheduling techniques. For example, as shown in FIG. 6, data structure 600 may not store values for Queue param 1 and Queue param 2 for the RR scheduling technique associated with base station 305. The Queue param 1 and Queue param 2 values, stored by data structure 600, for SGW 320 may correspond to PF-specific parameters (e.g., different priorities associated with the PF scheduling technique).

The WRED field, stored by data structure 600, may be used to specify a manner in which full queues will drop packets. For example, the WRED field may store probabilities of drop at certain queue occupancies, mapped to Differentiated Services Code Point ("DSCP") code points that correspond to drop precedence. In some implementations, a particular value stored in the WRED field (e.g., a value of 0) may indicate that WRED should not be used when dropping packets. In such situations, a different technique may be used to drop packets, such as a tail drop technique.

While example data structure 600 is illustrated as including certain types of information, in practice, data structure 600 may store additional, fewer, different, or differently arranged types of information. Furthermore, while data structure 600 is a table, in practice, data structure 600 may take the form of any other type of data structure, such as an array, a linked list, a hash table, a tree, and/or any other type of data structure.

System-wide scheduler 520 may analyze information regarding received KPIs, QoS objectives, and schedulers of individual nodes, and may generate information regarding scheduling techniques and/or tunable parameters for the scheduling techniques based on the received information. For example, system-wide scheduler 520 may receive the information regarding KPIs from KPI information module 505, the information regarding the QoS objectives from QoS objectives repository 510, and the information regarding the schedulers of individual nodes from node scheduler information repository 515. For instance, system-wide scheduler 520 may analyze KPI information, and determine whether QoS objectives are being met.

Assume, for example, that the KPI information corresponds to the example shown in graphs 205-1 and 205-2, in FIG. 2. In this example, system-wide scheduler 520 may receive KPI information associated with base station 305, which identifies respective measures throughput of data sent to two different user devices 315, where one user device 315 experiences higher throughput than another user device 315. Further assume that system-wide scheduler 520 identifies that the queuing technique used by base station 305 is a RR queuing technique. Further still, assume that system-wide scheduler 520 identifies that the current QoS objectives specify that higher user device throughput is preferred over overall system throughput. However, as shown in graphs 205-1 and 205-2, the RR queuing technique, used by base station 305, may not be optimal for this particular QoS objective. That is, RR queuing may not yield an optimal device throughput.

In this situation, system-wide scheduler 520 may adjust the queuing technique used by base station 305 to another queuing technique that better suits the QoS objective. For example, system-wide scheduler 520 may select a PF queuing technique for system-wide scheduler 520, and may select parameters for the PF queuing technique based on the KPIs received (e.g., may assign a higher priority to traffic associated with a particular user device 315).

Additionally, or alternatively, system-wide scheduler 520 may adjust the queuing techniques and/or queuing parameters used by other nodes, based on KPIs that were measured at base station 305. For example, a situation may occur where the queuing technique used by base station 305 is theoretically optimal for a particular QoS objective, but where SGW 320 uses a scheduling technique or parameters that are not optimal for the QoS objective. In this situation, system-wide scheduler 520 may select a scheduling technique and/or parameters that are better suited for the QoS objective.

After selecting queuing techniques and/or parameters, system-wide scheduler 520 may store and/or output information identifying the selected techniques and/or parameters. For example, system-wide scheduler 520 may output the information to nodes, which in turn implement the selected queuing techniques and/or parameters.

In some implementations, system-wide scheduler 520 may perform the above methodology in an iterative fashion. That is, after selecting a set of queuing techniques and/or parameters, system-wide scheduler 520 may continue to monitor KPIs from one or more nodes. In some implementations, system-wide scheduler 520 may monitor KPIs on a per-user device basis (e.g., may monitor throughput, latency, packet loss, etc. associated with each user device of a group of user devices).

System-wide scheduler 520 may determine, based on subsequently received KPIs, if a previous adjustment was successful (e.g., whether the previous adjustment served a particular QoS objective). If the adjustment was successful, system-wide scheduler 520 may continue to make similar adjustments (e.g., if system-wide scheduler 520 reduced the value of a particular parameter, system-wide scheduler 520 may reduce the value of the parameter even further). If the adjustment was not successful, system-wide scheduler 520 may revert the scheduling queuing techniques and/or parameters to an earlier state (e.g., may revert to a previous set of queuing techniques and/or parameters). Additionally, or alternatively, system-wide scheduler 520 may attempt a different set of queuing techniques and/or parameters. In this sense, system-wide scheduler 520 may continuously attempt to improve the performance of a network, based on end-to-end QoS objectives and on continuously-monitored current KPI data.

Figure 7:
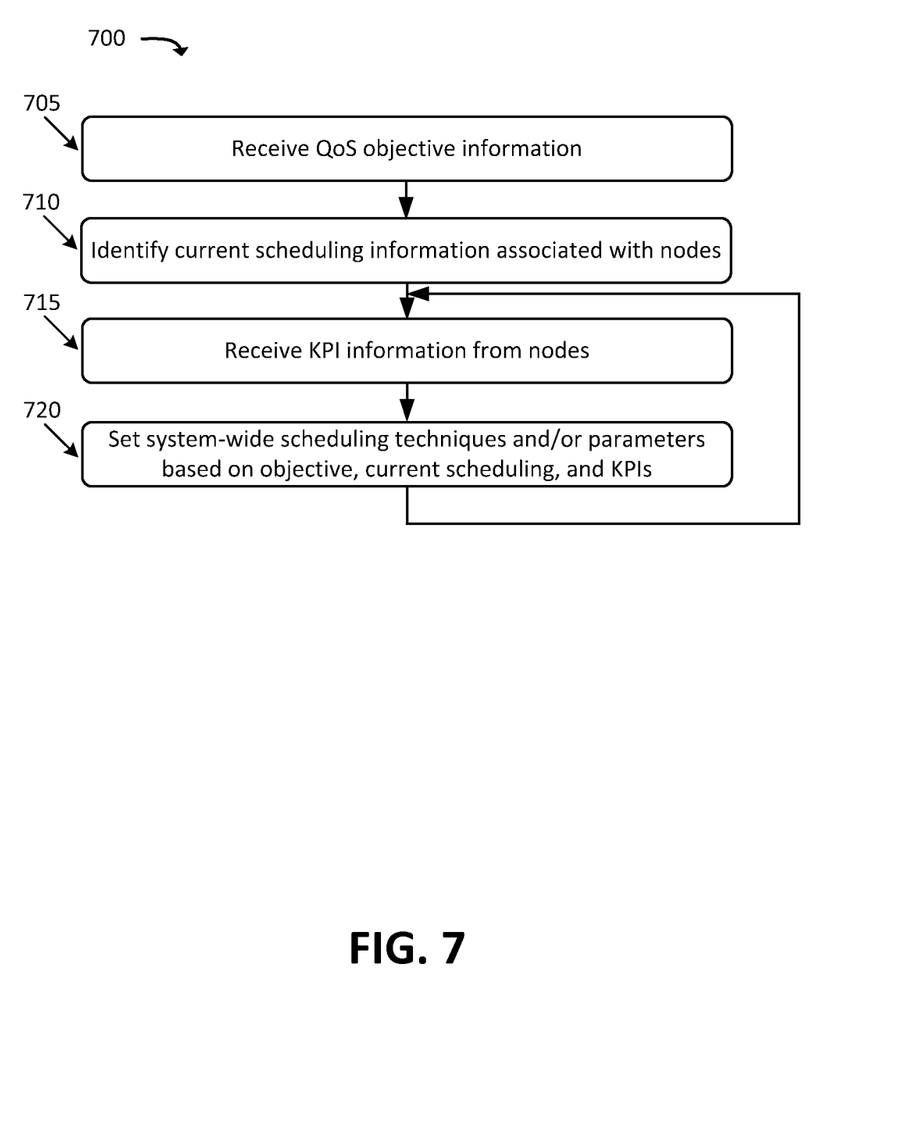
FIG. 7 illustrates an example process for system-wide QoS scheduling.

FIG. 7 illustrates an example process for system-wide end-to-end QoS scheduling. In one example implementation, process 700 may be performed by SWSE 360. In other implementations, some or all of process 700 may be performed by one or more other devices in lieu of, or in conjunction with, SWSE 360.

Process 700 may include receiving QoS objective information (block 705). For example, as described above with respect to QoS objectives repository 510, SWSE 360 may receive KPI objective information from, for example, an administrator associated with SWSE 360.

Process 700 may additionally include identifying current information regarding scheduling techniques and/or tunable parameters for the scheduling techniques associated with nodes (block 710). For example, as described above with respect to node scheduler information repository 515, SWSE 360 may identify scheduling techniques and/or parameters currently in use by nodes (e.g., by base station 305, SGW 320, and/or PGW 330).

Process 700 may additionally include receiving KPI information from nodes (block 715). For example, as described above with respect to KPI information module 505, SWSE 360 may receive KPI information from one or more nodes (e.g., from one or more KPI reporting modules 405, shown in FIG. 4).

Process 700 may also include setting system-wide scheduling techniques and/or parameters based on the received objective information, the current information regarding scheduling techniques and/or tunable parameters for the scheduling techniques, and the received KPI information (block 720). For example, as described above with respect to system-wide scheduler 520, SWSE 360 may set scheduling techniques and/or parameters for one or more of the nodes based on the information received at blocks 705, 710, and/or 715. As also described above, SWSE 360 may continuously monitor KPI information (at subsequent iterations of block 715), and may continuously set scheduling techniques (at subsequent iterations of block 720) for nodes based on the KPI information and the QoS objective.

Furthermore, such an iterative process allows for dynamic changes in QoS objectives. For example, an administrator may change the QoS objective while blocks 715 and 720 are being iteratively performed. As mentioned above, SWSE 360 may set scheduling techniques and/or algorithms (at block 720) based, at least partly, on QoS objectives. When QoS objectives change, SWSE 360 may automatically adjust scheduling techniques and/or algorithms based on the changing objectives.

Figure 8:
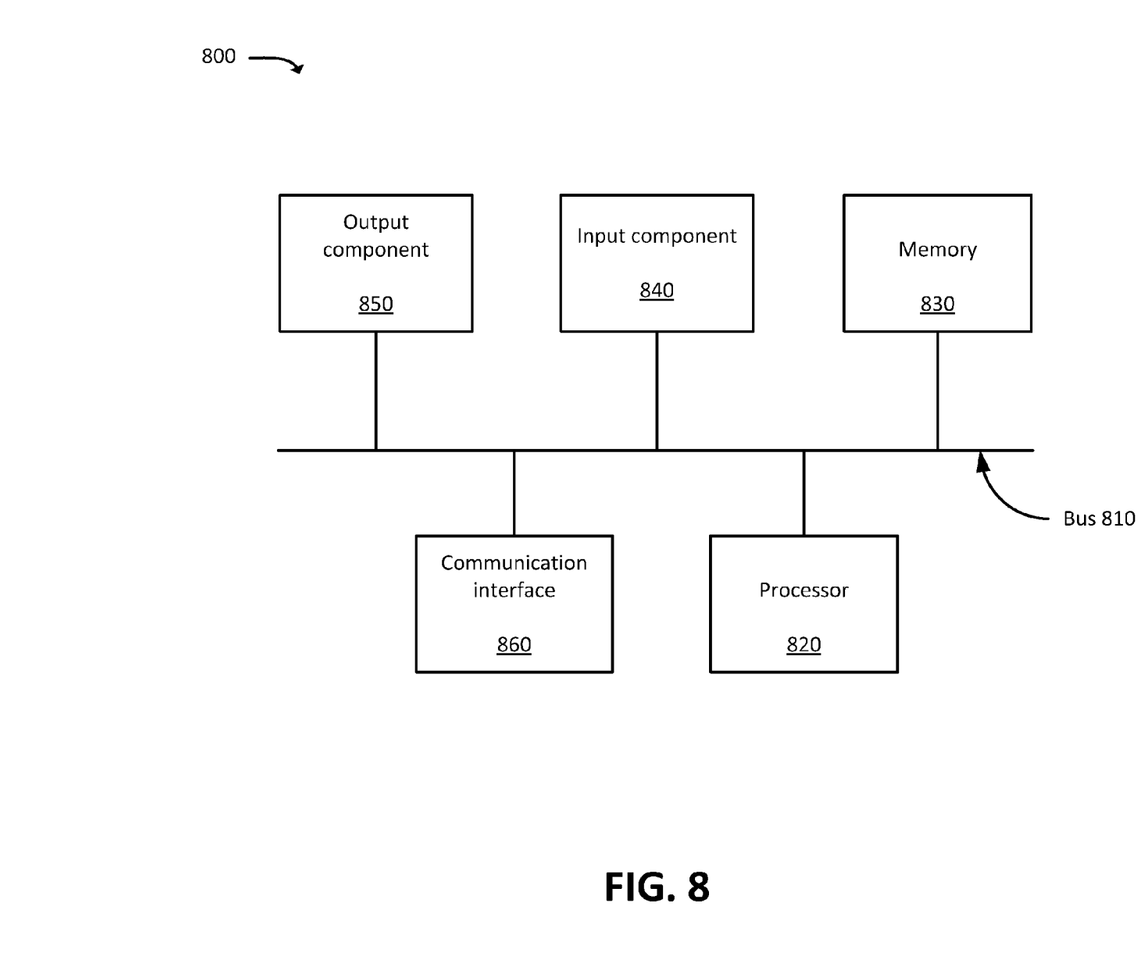
FIG. 8 illustrate example components of one or more devices shown in FIGS. 1 and 3.

FIG. 8 is a diagram of example components of device 800. One or more of the devices illustrated in FIG. 1 or 3 may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks has been described with regard to FIG. 7, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items, and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method, comprising:
   receiving, by a server device, information regarding a quality of service ("QoS") objective for a network,
      wherein the network comprises a plurality of nodes through which network traffic traverses,
      wherein each node, of the plurality of nodes, implements one or more queues that indicate an order in which traffic is processed by the node;
   identifying, by the server device, first scheduling information associated with one or more nodes of the network,
      wherein traffic associated with the one or more queues, implemented by the one or more nodes, is processed in an order that is based on the identified first scheduling information;
   receiving, by the server device, performance information from two or more nodes, of the plurality of nodes; and
   generating, by the server device, second scheduling information for at least one node, of the plurality of nodes, based on:
      the information regarding the QoS objective,
      the first scheduling information associated with the one or more nodes, and
      the received performance information.

2. The method of claim 1, further comprising outputting the generated second scheduling information to the at least one node.

3. The method of claim 2, wherein a particular node, of the at least one node, implements a first scheduling technique prior to receiving the new scheduling information,
   wherein, after receiving the second scheduling information, the particular node implements a second scheduling technique in lieu of implementing the first scheduling technique.

4. The method of claim 1, wherein the first scheduling information associated with a particular node, of the one or more nodes, includes information identifying a particular scheduling technique.

5. The method of claim 4, wherein the particular scheduling technique includes at least one of:
   a round-robin scheduling technique,
   a proportional fair scheduling technique,
   a weighted first queuing scheduling technique,
   a shortest job first scheduling technique,
   a shortest time remaining scheduling technique,
   a fixed priority preemptive scheduling technique, and
   a multi-level queue scheduling technique.

6. The method of claim 4, wherein the first scheduling information associated with a particular node, of the one or more nodes, further includes information identifying a set of parameters associated with the particular scheduling technique.

7. The method of claim 1, wherein the plurality of nodes includes at least one of:
   a base station associated with a wireless network,
   a serving gateway associated with the wireless network, and
   a packet data network gateway associated with the wireless network.

8. A system, comprising:
   a memory device to store a set of computer-executable instructions; and
   one or more processors to execute the computer-executable instructions, to:
      receive information regarding a quality of service ("QoS") objective for a network,
         wherein the network comprises a plurality of nodes through which network traffic traverses,
         wherein each node, of the plurality of nodes, implements one or more queues that indicate an order in which traffic is processed by the node;
      identify first scheduling information associated with two or more nodes of the network,
         wherein traffic associated with the one or more queues, implemented by the one or more nodes, is processed in an order that is based on the identified first scheduling information;
      receive performance information from a set of the nodes, of the plurality of nodes; and
      generate second scheduling information for at least one node, of the plurality of nodes, based on:
         the information regarding the QoS objective,
         the first scheduling information associated with the two or more nodes, and
         the received performance information.

9. The system of claim 8, wherein the one or more processors are further to output the generated second scheduling information to the at least one node.

10. The system of claim 9, wherein a particular node, of the at least one node, implements a first scheduling technique prior to receiving the second scheduling information,
  wherein, after receiving the second scheduling information, the particular node implements a second scheduling technique in lieu of implementing the first scheduling technique.

11. The system of claim 8, wherein the first scheduling information associated with a particular node, of the two or more nodes, includes information identifying a particular scheduling technique.

12. The system of claim 11, wherein the particular scheduling technique includes at least one of:
  a round-robin scheduling technique,
  a proportional fair scheduling technique,
  a weighted first queuing scheduling technique,
  a shortest job first scheduling technique,
  a shortest time remaining scheduling technique,
  a fixed priority preemptive scheduling technique, and
  a multi-level queue scheduling technique.

13. The system of claim 8, wherein the first scheduling information associated with a particular node, of the two or more nodes, further includes information identifying a set of parameters associated with the particular scheduling technique.

14. The system of claim 8, wherein the plurality of nodes includes at least one of:
  a base station associated with a wireless network,
  a serving gateway associated with the wireless network, and
  a packet data network gateway associated with the wireless network.

15. A non-transitory computer-readable medium, comprising:
  a plurality of computer-executable instructions, which, when executed by one or more processors, cause the one or more processors to:
    receive information regarding a quality of service ("QoS") objective for a network,
      wherein the network comprises a plurality of nodes through which network traffic traverses,
      wherein traffic associated with one or more queues, implemented by the one or more nodes, is processed in an order that is based on first scheduling information;
    receive performance information from a set of nodes, of the plurality of nodes; and
    generate second scheduling information for at least one node, of the plurality of nodes, based on:
      the information regarding the QoS objective,
      the first scheduling information associated with the one or more nodes, and
      the received performance information.

16. The non-transitory computer-readable medium of claim 15, wherein the scheduling information associated with a particular node, of the one or more nodes, includes information identifying a particular scheduling technique.

17. The non-transitory computer-readable medium of claim 16, wherein the particular scheduling technique includes at least one of:
  a round-robin scheduling technique,
  a proportional fair scheduling technique,
  a weighted first queuing scheduling technique,
  a shortest job first scheduling technique,
  a shortest time remaining scheduling technique,
  a fixed priority preemptive scheduling technique, and
  a multi-level queue scheduling technique.

18. The non-transitory computer-readable medium of claim 15, wherein the first scheduling information associated with a particular node, of the one or more nodes, further includes information identifying a set of parameters associated with the particular scheduling technique.

19. The method of claim 1, wherein the QoS objective is related to at least one of:
  maximizing throughput of traffic associated with a particular user device,
  maximizing throughput of traffic through the network,
  minimizing latency of traffic associated with the particular user device, or
  minimizing packet loss.

* * * * *